United States Patent
Sugino et al.

(10) Patent No.: US 12,495,797 B2
(45) Date of Patent: Dec. 16, 2025

(54) INSECT REPELLENT

(71) Applicant: Rilis Co., Ltd., Osaka (JP)

(72) Inventors: Tsutomu Sugino, Osaka (JP); Atsushi Henmi, Osaka (JP); Kenichi Nakamura, Osaka (JP); Masakuni Okuhara, Osaka (JP)

(73) Assignee: Rilis Co., Ltd., Osaka (JP)

( * ) Notice: Subject to any disclaimer, the term of this patent is extended or adjusted under 35 U.S.C. 154(b) by 909 days.

(21) Appl. No.: 17/640,901

(22) PCT Filed: Oct. 1, 2019

(86) PCT No.: PCT/JP2019/038710
§ 371 (c)(1),
(2) Date: Mar. 7, 2022

(87) PCT Pub. No.: WO2021/064855
PCT Pub. Date: Apr. 8, 2021

(65) Prior Publication Data
US 2022/0330547 A1    Oct. 20, 2022

(51) Int. Cl.
*A01N 35/04* (2006.01)
*A01P 17/00* (2006.01)

(52) U.S. Cl.
CPC .............. *A01N 35/04* (2013.01); *A01P 17/00* (2021.08)

(58) Field of Classification Search
CPC .................. A01N 35/04; A01P 17/00
See application file for complete search history.

(56) References Cited

FOREIGN PATENT DOCUMENTS

| JP | H10-316507 A | 12/1998 |
|---|---|---|
| JP | 2019-123687 A | 7/2019 |

OTHER PUBLICATIONS

Chermenskaya et al. (Industrial Corps and Products, 36, 2012, 122-126). (Year: 2012).*
Akyev et al. (Inst. of Chemistry of Plant Substances, p. 390, 1973). (Year: 1973).*
Chen (CN 1288983, publication date: Dec. 13, 2006, English translation ) (Year: 2006).*
Tringali et al. (Fitoterapia, 72, 2001, 538-543) (Year: 2001).*
European and Mediterranean Plant Protection Organization (EMPPO) (45(3), 410-444, 2015). (Year: 2015).*
Sun et al. (Ultrasonics Sonochemistry, 20, 2013, 180-186). (Year: 2013).*
Wang et al. (CN 104304338, see English translation, publication date: Jan. 28, 2015). (Year: 2015).*
Simmonds (Journal of Chemical Ecology, vol. 16, No. 2, 1990). (Year: 1990).*
International Search Report issued in PCT/JP2019/038710 mailed on Nov. 12, 2019 with English Translation (5 pages).
Xiaosong Ge et al., "Ovipositional and Feeding Deterrent from Chinese Prickly Ash Against Angoumois Grain Moth (*Lepidoptera: Gelechiidae*)", Journal of Economic Entomology, 1995, vol. 88, No. 6, pp. 1771-1775, ISSN: 0022-0493 (5 pages).

\* cited by examiner

*Primary Examiner* — Umamaheswari Ramachandran
(74) *Attorney, Agent, or Firm* — Nakanishi IP Associates, LLC

(57) ABSTRACT

An insect repellent is suitable for an anti-tick treatment to living materials such as bedding and carpets with long-term replacement cycles in years and that also has a tick repellent effect stably lasting over a long period of time. The insect repellent contains 2,4-DHAP or xanthoxyline as an active ingredient. 2,4-DHAP and xanthoxyline can stably maintain repellency rates of at least 30-40% and about 90% respectively even if a heating treatment at 150° C. is continued for 5 minutes or longer, that is, for about 3 years in an environment of 25° C.

1 Claim, 1 Drawing Sheet

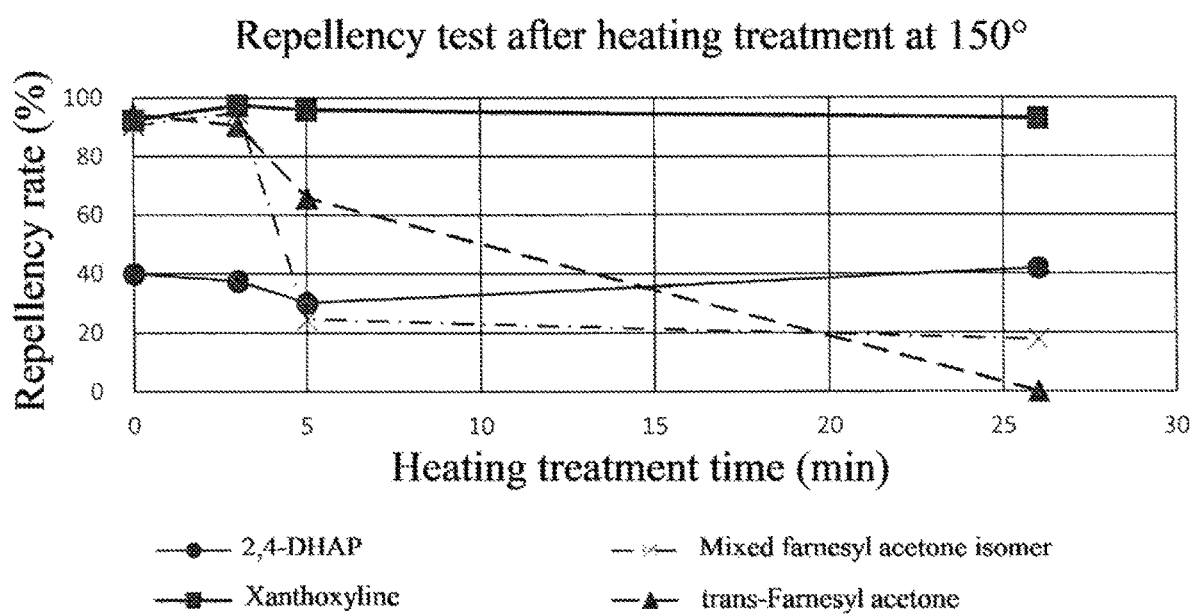

INSECT REPELLENT

TECHNICAL FIELD

The present invention relates to an insect repellent that can stably obtain the effect of repelling insects, particularly ticks, over a long period of time.

BACKGROUND ART

Patent Literature 1, for example, discloses that the object of obtaining a pest control agent, which has high safety, makes it difficult for ticks to develop resistance, and is suitable for an anti-tick treatment to living materials such as bedding and carpets, is achieved by containing farnesyl acetone as an active ingredient.

Patent Literature 1 also discloses as an effect the tick repellent effect lasting for a long period of time, and Examples thereof indicate test results that 95% or more of the repellent effect could be maintained over 14 days.

However, as described in Patent Literature 1, for example, when it is supposed that living materials such as bedding and carpets are subjected to an anti-tick treatment using farnesyl acetone as a pest control agent, the following problem will develop.

For example, if there is a heat treatment step in the step of the anti-tick treatment, because oxidation reactivity due to heat is high, the repellent effect is already reduced to 30% or less after about 3 minutes in an environment of 150° C., and the repellent effect is reduced to 0% by at most 60 minutes. That is to say, it is troublesome to subject living materials of interest to the anti-tick treatment.

There is also the following problem in lasting properties of the repellent effect over a "long period of time." Surely, although the repellency rate remained high over 14 days, when it is premised that living materials are subjected to the anti-tick treatment, unlike e.g. individual insecticides, bedding and carpets are not replaced e.g. after a few weeks even when the effect is reduced, and they are always continued to be used in years.

That is to say, when it is supposed that living materials used in years are subjected to the anti-tick treatment, if the effect of farnesyl acetone lasts only at most a few weeks (about 14 days) because the oxidation reactivity thereof is high as described above, farnesyl acetone is not suitable as an anti-tick treatment agent for living materials such as bedding and carpets.

CITATION LIST

Patent Literature

Patent Literature 1: Japanese Unexamined Patent Application Publication No. 10-316507

SUMMARY OF INVENTION

Technical Problem

A problem to be solved is that because the repellent effect quickly decreases by oxidative modification due to heat in the processing (treatment) step, farnesyl acetone is not suitable as an anti-tick treatment agent for living materials such as bedding and carpets with long-term replacement cycles in years.

Solution to Problem

In order to solve the above problem, the tick repellent of the present invention was characterized by containing 2,4-DHAP or xanthoxyline as an active ingredient.

Advantageous Effect of Invention

According to the above composition, because 2,4-DHAP and xanthoxyline have low transpiration properties, $6 \times 10^{-5}$ mmHg and $1.5 \times 10^{-5}$ mmHg respectively, under conditions of 25° C. and are also difficult to oxidize and stable compared to farnesyl acetone as described in tests below, they are easy to handle in treatment steps when diverted to various products as an anti-tick agent, and also the tick repellent effect lasts over a long period of time even after they are diverted to products. That is to say, the present invention can be processed into and applied to living materials such as bedding and carpets and fibers, and is also suitable to be adopted as an anti-tick treatment agent for living materials such as bedding and carpets with long-term replacement cycles in years.

BRIEF DESCRIPTION OF DRAWINGS

FIG. 1 is a graph showing repellency rates of 2,4-DHAP, xanthoxyline, mixed farnesyl acetone isomers, and trans-farnesyl acetone.

DESCRIPTION OF EMBODIMENT

The present invention found 2,4-DHAP or xanthoxyline as an anti-tick treatment agent for living materials such as bedding and carpets with long-term replacement cycles in years, thereby achieving an object that oxidation reactivity is low in treatment steps and the tick repellent effect lasts over a long period of time in years after the treatment.

That is to say, the inventors of the present application took interest in high oxidation reactivity of farnesyl acetone, difficulty to handle it in the anti-tick treatment step due to the high reactivity, and lasting properties of the repellent effect when bedding and carpets are subjected to the anti-tick treatment, and searched for materials better than farnesyl acetone, and consequently reached 2,4-DHAP and xanthoxyline. The formal notation of 2,4-DHAP is 2',4'-dihydroxyacetophenone, and it is also called 4-acetylresorcinol or resacetophenone as another name. Xanthoxyline is also called brevifolin as another name.

2,4-DHAP and xanthoxyline have an acetophenone skeleton. 2,4-DHAP is largely extracted, for example, by a solvent such as ethyl acetate, for example, from *Cynanchum wilfordii, Vincetoxicum pycnostelma* or *Moutan cortex*. Xanthoxyline is largely extracted, for example, by a solvent such as ethyl acetate, for example, from *Zanthoxylum bungeanum* (Sichuan pepper), Japanese pepper, *Sapium sebiferum, Blumea balsamifera* or *Punica granatum*.

In the present invention, the repellent effect and insecticidal effect are clearly distinguished. An object of the present invention is not to obtain the insecticidal effect. The reason is that tick carcasses due to insecticide become feed for other ticks to promote propagation, and tick carcasses cause human allergy reactions. Contrarily, because the repellent effect means to keep ticks away, tick carcasses are not produced (in a large amount as the insecticidal effect), propagation is suppressed, and allergy reactions due to ticks are also not caused. Therefore, it is advantageous to adopt the repellent effect for living materials.

The inventors of the present application performed the following experiments to compare oxidative reactions of farnesyl acetone, 2,4-DHAP and xanthoxyline. It should be noted that for farnesyl acetone, the experiments were performed on both a reagent of what is called mixed isomers, in which the cis-form and trans-form thereof are mixed (hereinafter referred to as mixed farnesyl acetone isomers) and trans-farnesyl acetone.

Each filter paper, processed by each sample, 1 g/m², of mixed farnesyl acetone isomers, trans-farnesyl acetone, 2,4-DHAP and xanthoxyline, was (A) measured by high performance liquid gas chromatography on the day and (B) measured by high performance liquid gas chromatography after a 100 milli-litter flask including it was covered with a plastic wrap, sealed with a double rubber band and shook under an atmosphere of 40° C. at 150 rpm for a week. The results are shown in Table 1 below.

It should be noted that for measurement by high performance liquid gas chromatography, mixed farnesyl acetone isomers, trans-farnesyl acetone, 2,4-DHAP or xanthoxyline was extracted from each filter paper by stirring in 9 milli-liter of ethanol for 30 minutes, and the volume of the obtained solution was made to 10 milli-liter using a measuring flask, and 20 micro-litter of the solution was injected to high performance liquid chromatography (a liquid extracted from the filter paper processed by xanthoxyline was half diluted with methanol and 20 micro-liter was injected).

TABLE 1

| | Day of experiment (area) | After 1 week (area) | Variation (Oxidation) (%) |
|---|---|---|---|
| Mixed farnesyl acetone isomers | 3145831 | 1038335 | decreased by 67.10% |
| trans-Farnesyl acetone | 4022168 | 3246218 | decreased by 19.29% |
| 2,4-DHAP | 12027833 | 11130386 | decreased by 7.46% |
| Xanthoxyline | 5756751 | 5617299 | decreased by 2.42% |

As described above, the oxidative modification was as much as 67.10% for a week in mixed farnesyl acetone isomers, and the oxidative modification was 19.29% for a week in trans-farnesyl acetone. Contrarily, the oxidative modification was 7.4% for a week in 2,4-DHAP and 2.42% for a week in xanthoxyline.

Subsequently, a relationship between the tick repellent effect resulting from a difference in oxidative modification rate and time was examined. In the test, mixed farnesyl acetone isomers, trans-farnesyl acetone, 2,4-DHAP and xanthoxyline were each dissolved to 1 g/m² in acetone, and each filter paper added thereto was heated at 150° C. only for 3 minutes, 5 minutes or 26 minutes. The filter paper not heated (hereinafter referred to as 150° C., 0 min) was also prepared.

Each filter paper was placed on the center of a petri dish with a diameter of 4 cm, and 0.05 g of an attractant sample was placed on the center of filter paper. The petri dish was placed on the center of another petri dish with a diameter of 9 cm, and about 10000 ticks were provided together with a medium to this another petri dish, which was left to stand for 24 hours. After that, ticks in the 4 cm petri dish were counted.

For the repellency rate, the proportion of the number of ticks which had not been attracted was calculated by the following formula using the number of ticks entering the petri dish on which only the attractant sample was placed, x (control), and contrarily the number of ticks entering the petri dish on which mixed farnesyl acetone isomers, trans-farnesyl acetone, 2,4-DHAP or xanthoxyline was placed, n. The results are shown in Table 2. In addition, the graph obtained by plotting the results in Table 2 is shown in FIG. 1.

Repellency rate=$\{(x-n)/x\} \times 100(\%)$

* a small number of entering ticks=high repellency rate

It should be noted that the heating time at 150° C. is not described in detail herein, but was converted by the following Arrhenius equation described in "Sumie Yoshioka, Stability of drugs and dosage forms, p. 142, 1995, Nankodo Co., Ltd." as in Drug testing on Stability studies.

Arrhenius equation: $k = A \exp(-E/RT)$

* Activation energy of stability studies E=22.1 kcal/mol.

TABLE 2

| | 0 min | 3 min | 5 min | 26 min |
|---|---|---|---|---|
| Mixed farnesyl acetone isomers | 90.60% | 94.90% | 24.60% | 17.60% |
| trans-Farnesyl acetone | 94.30% | 90.50% | 65.70% | 0.00% |
| 2,4-DHAP | 39.80% | 37.40% | 40.90% | 41.70% |
| Xanthoxyline | 92.40% | 97.40% | 95.80% | 93.00% |

*0 min: —.
*3 min: corresponding to 25° C., about 4 months.
*5 min: corresponding to 25° C., about 7 months.
*26 min: corresponding to 25° C., about 3 years.

As shown above, the repellency rates of xanthoxyline, mixed farnesyl acetone isomers and trans-farnesyl acetone were about twice higher than that of 2,4-DHAP until 150° C., 3 min. However, the repellency rates were reduced at 150° C., 5 min as a whole. Among these, the repellency rate of mixed farnesyl acetone isomers was sharply reduced to 30% compared to until 3 min and lower than that of 2,4-DHAP, and the repellency rate was 17.6% at 26 min.

The repellency rate of trans-farnesyl acetone at 150° C., 5 min was also reduced to below 65% compared to until 3 min, though not to the extent of mixed farnesyl acetone isomers, and the repellency rate was reduced with the passage of time and became 0% at 26 min.

Meanwhile, the repellency rate of 2,4-DHAP was 30-40% until 3 min as shown above, but could be maintained at about 40% until 5 min and 26 min. As shown above, the repellency rate of xanthoxyline could be constantly maintained at 90% or more until 3 min, 5 min and 26 min.

That is to say, it turned out that mixed farnesyl acetone isomers and trans-farnesyl acetone could not maintain (at least 30% or more of) the repellent effect for about 3 years, which was converted as a normal use environment of 25° C. It contrarily turned out that 2,4-DHAP and xanthoxyline could stably maintain at least 30% of the repellency rate for about 3 years.

Incidentally, a tick killing experiment was performed by a filter paper contact method to examine whether or not the insecticidal effect is contained in the repellent effect of 2,4-DHAP and xanthoxyline. In the experiment, ticks attracted to the untreated site in the repellent test by the petri-dish method were obtained on a filter paper by the sodium chloride floatation method, and living ticks were gently taken with a fine brush (one stroke). A 5 cm×10 cm filter paper permeated with 1 g/m² of a sample was dried in air and shaped into a bag form. The taken ticks were put therein, and the opening thereof was closed with clips. After 24 hours, living ticks and dead ticks were measured.

In the tick killing test, 2,4-DHAP, xanthoxyline and DEET were compared. DEET is a compound used as a repellent for e.g. insects (anti-insect agent), and is also called N,N-diethyl-3-methylbenzamide or N,N-diethyl-m-toluamide.

In Table 3, the mortality rates (%) of 2,4-DHAP, xanthoxyline and DEET are values corrected by the mortality rate without treatment based on the mortality rate without treatment.

TABLE 3

|  | Dead ticks | Living ticks | Mortality rate (%) | After correction (%) |
|---|---|---|---|---|
| Without | 3 | 46 | 6.1 |  |
| treatment | 7 | 50 | 12.3 |  |
| Average | 5 | 48 | 9.2 |  |
| 2,4-DHAP | 2 | 81 | 2.4 | 0.0 |
|  | 6 | 131 | 4.4 | 0.0 |
| Average | 4 | 106 | 3.4 | 0.0 |
| Xanthoxyline | 26 | 90 | 22.4 | 14.6 |
|  | 22 | 59 | 27.2 | 19.8 |
| Average | 24 | 75 | 24.8 | 17.2 |
| DEET | 87 | 0 | 100.0 | 100.0 |
|  | 36 | 3 | 92.3 | 91.5 |
| Average | 62 | 2 | 96.2 | 95.8 |

According to the above, the mortality rates of 2,4-DHAP and xanthoxyline were low to the extent that an insecticidal effect was not recognized, compared to a mortality rate of 95.8% in DEET. Because of this, it turned out that the present invention did not kill living ticks and kept ticks (which are required to kill) away.

Therefore, because living materials adopting the present invention maintain the effect of keeping ticks away over a long period of time, problems such as the promotion of propagation by tick carcasses are not developed. In addition, at least allergy reactions caused by tick carcasses are suppressed and hygienic and comfortable materials can be obtained. It should be noted that both 2,4-DHAP and xanthoxyline exist in natural plants which do not have direct bad influences on human bodies and thus has high safety.

The invention claimed is:

1. A method of repelling ticks comprising applying a tick repellent composition containing, as an active ingredient:
   2',4'-dihydroxyacetophenone (2,4-DHAP) extracted by ethyl acetate as a solvent from *Cynanchum wilfordii, Vincetoxicum pycnostelma* or *Moutan cortex*; or
   xanthoxyline extracted by ethyl acetate as a solvent from *Zanthoxylum bungeanum*, Japanese pepper, *Sapium sebiferum, Blumea balsamifera* or *Punica granatum*,
   wherein:
   the tick repellent composition maintains a repellent effect against ticks in an environment of 25° C. from 7 months to 3 years.

* * * * *